United States Patent [19]

Anstett

[11] Patent Number: 4,470,531

[45] Date of Patent: Sep. 11, 1984

[54] NAILING MACHINE

[76] Inventor: Edgar P. Anstett, 21 Lakewood Pl., Highland Park, Ill. 60035

[21] Appl. No.: 331,633

[22] Filed: Dec. 17, 1981

Related U.S. Application Data

[63] Continuation-in-part of Ser. No. 115,957, Jan. 28, 1980, abandoned, which is a continuation-in-part of Ser. No. 876,746, Feb. 10, 1978, Pat. No. 4,220,070.

[51] Int. Cl.³ ................................................ B25C 1/04
[52] U.S. Cl. ........................................ 227/8; 227/116; 227/126; 227/130; 227/139
[58] Field of Search .................... 227/8, 120, 129, 126, 227/130, 131, 139, 156, 116

[56] References Cited

U.S. PATENT DOCUMENTS

| | | | |
|---|---|---|---|
| 1,486,639 | 3/1924 | Crofoot | 411/442 X |
| 1,684,728 | 9/1928 | Crofoot | 411/444 |
| 2,174,708 | 10/1939 | Sears et al. | 411/444 X |
| 3,198,412 | 8/1965 | Roosa | 227/109 |
| 3,601,300 | 1/1970 | Anstett | 227/130 X |
| 4,197,974 | 4/1980 | Morton et al. | 227/130 X |
| 4,319,706 | 3/1982 | Halstead | 227/130 X |
| 4,380,312 | 4/1983 | Landrus | 227/131 X |

Primary Examiner—Paul A. Bell
Attorney, Agent, or Firm—Wallenstein, Wagner, Hattis, Strampel & Aubel

[57] ABSTRACT

An improved nailing machine including a reciprocatable plunger for sequentially severing and driving nails from a nailing strip, and a reciprocatable piston for advancing and retracting the plunger. The machine includes a unique reciprocatable control valve actuating and nail guide means which serves both to set a control trigger for activating the reciprocatable plunger, and to properly align a nail with a workpiece as the nail is driven into the workpiece, while at the same time maintaining the nailing strip in a fixed position to prevent contact between the driven nail and the next nail to be severed from the nailing strip. The machine further includes a magazine having retractable nailing strip advancing means which positively moves a nailing strip along the runway of the magazine, and which, in its retracted position, enables a nailing strip to be easily and readily inserted into or removed from the magazine of the machine.

3 Claims, 13 Drawing Figures

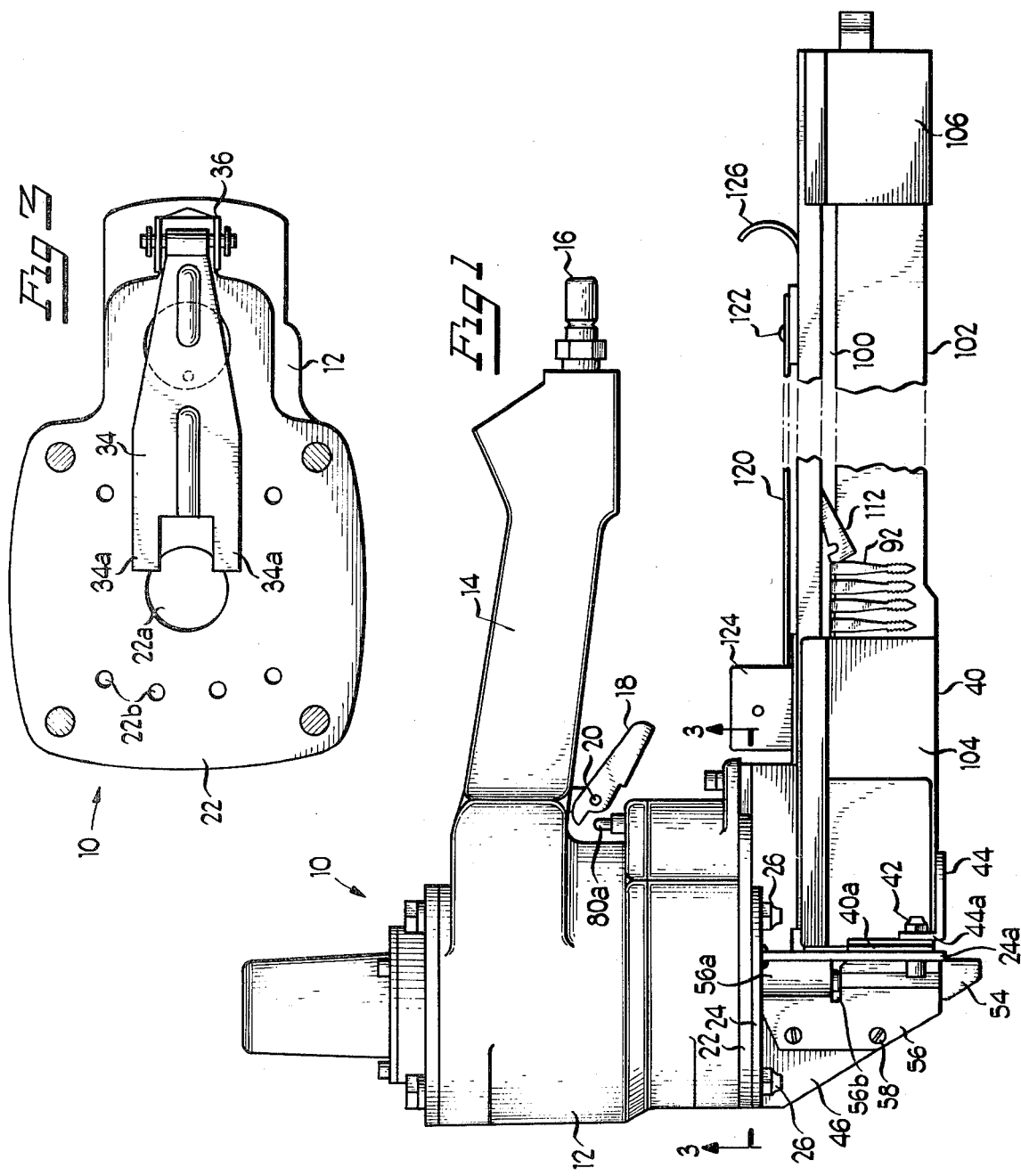

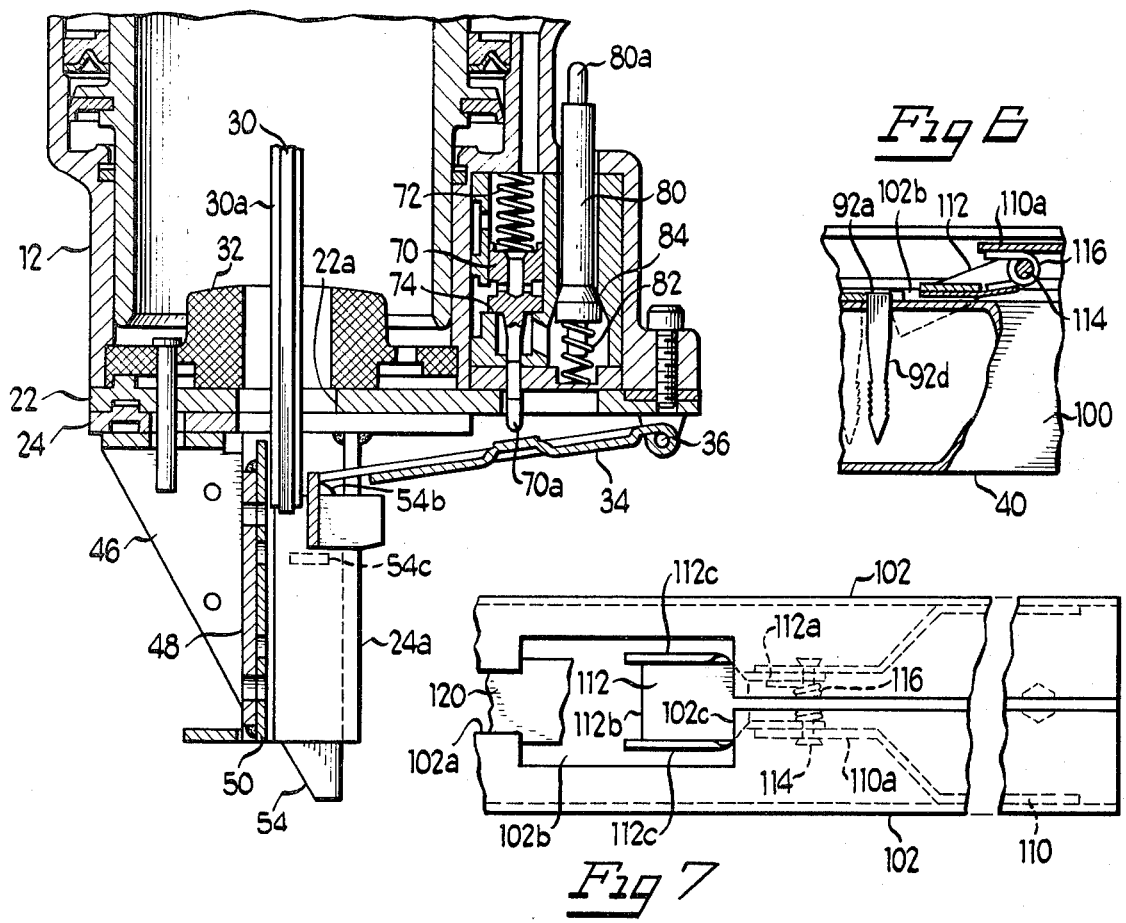
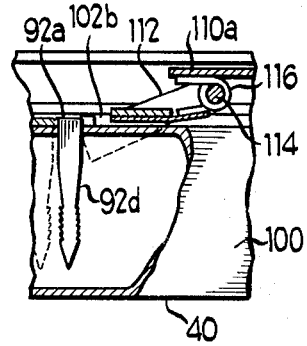
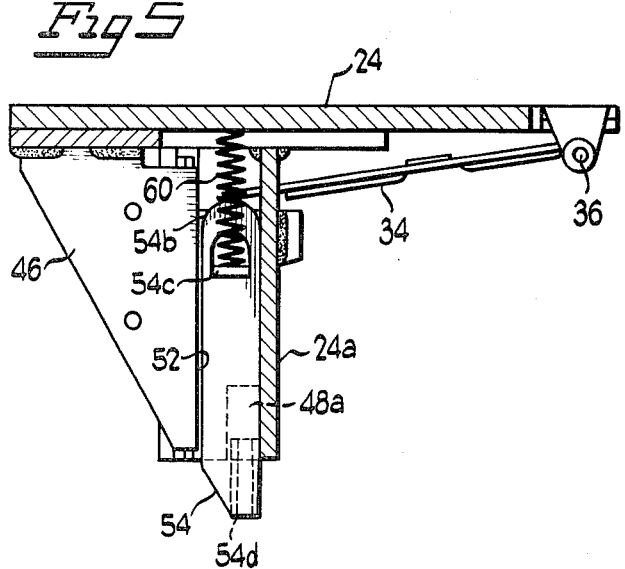
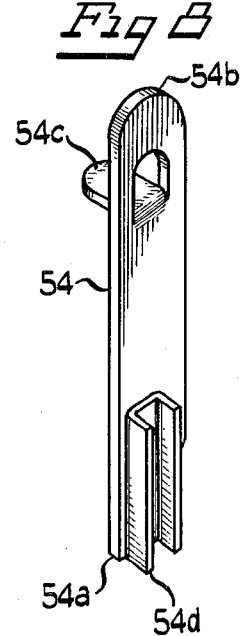

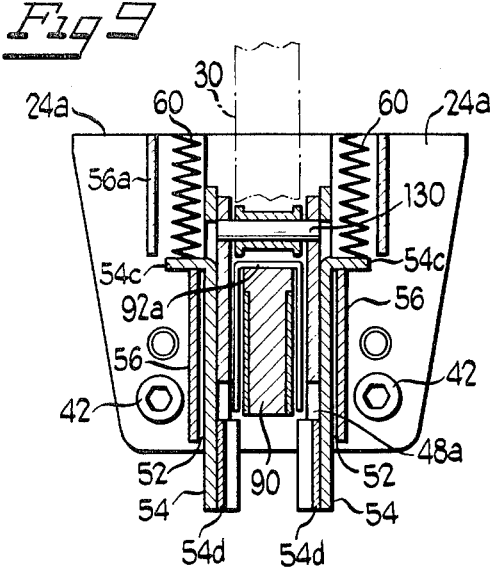
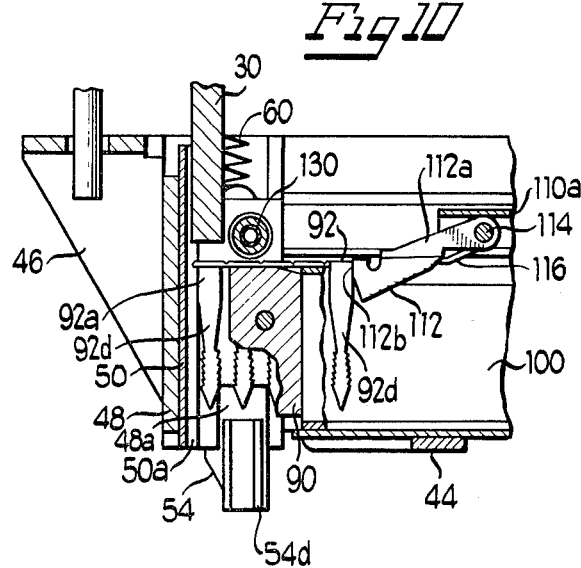
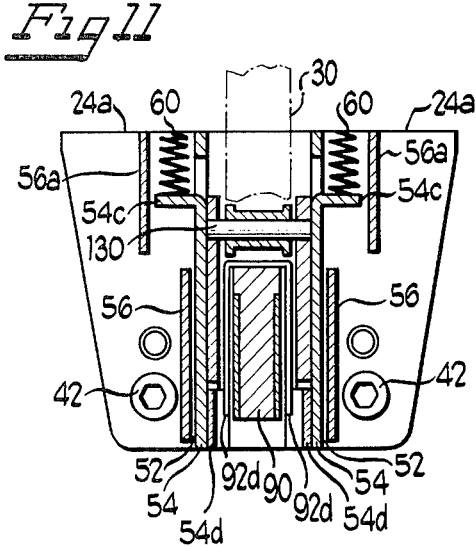
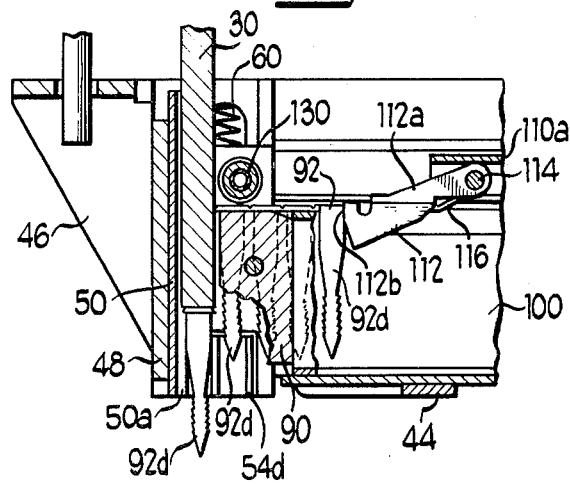
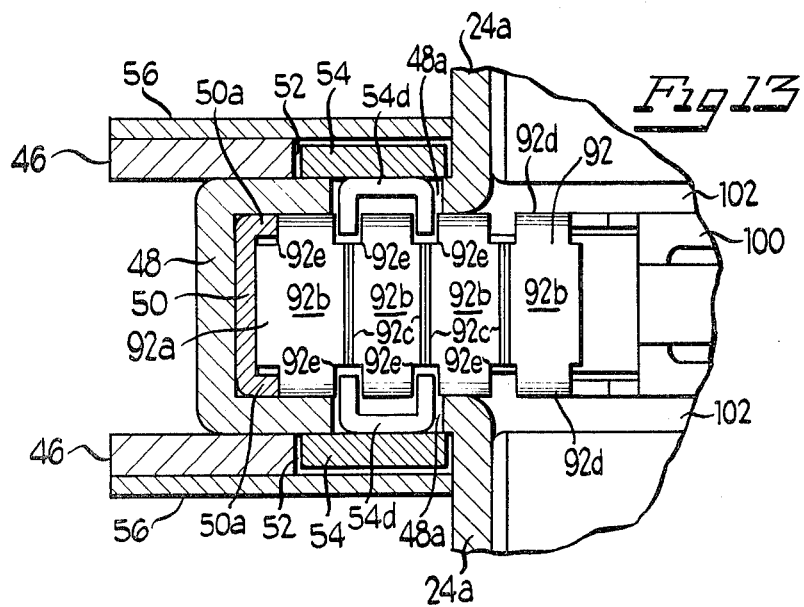

NAILING MACHINE

This application is a continuation-in-part application of pending application Ser. No. 115,957, filed Jan. 28, 1980, now abandoned which application was a continuation-in-part of application Ser. No. 876,746, filed Feb. 10, 1978, now U.S. Pat. No. 4,220,070, issued Sept. 2, 1980.

The present invention relates to improvements in nailing machines of the type capable of sequentially severing and driving nails from a nailing strip into a material.

The improved nailing machine of this invention may be of the hammer operated or power operated type. Exemplary of such a machine is the pneumatically operated nailing machine shown in my U.S. Pat. No. 3,601,300. The nailing machine of that patent, in brief, includes a hollow housing which is supplied with air under pressure, a reciprocatable blade or plunger which extends through the bottom of the housing for driving nails fed from a magazine joined to a foot plate secured to the housing, a reciprocatable differential piston unit which is located in the housing and which has a lower large diameter piston and an upper small diameter piston connected by a piston rod, and blade or plunger carrying means which secures the blade or plunger to the lower end of the differential piston unit so as to advance and retract the blade or plunger as the differential piston unit is reciprocated. A cylinder sleeve is reciprocatably mounted in the housing and it has a cylinder portion reciprocatingly receiving the lower large diameter piston of the differential piston unit. This cylinder sleeve has at its upper end an upwardly facing annular valve seat and an annular piston shoulder of small area therearound subject to the air under pressure in the housing. A cylinder member is located in the housing, and it has a cylinder reciprocatingly receiving the upper small diameter piston of the differential piston unit. The magazine from which the nails are fed to the reciprocatable blade or plunger is channel shaped and is adapted to receive and guide a strip of nails the heads of the nails extending over a guiding edge on a leg of the magazine.

The improved nailing machine of the present invention has been evolved in conjunction with the nailing strip disclosed in my aforementioned co-pending application Ser. No. 876,746. The nailing strip comprises an elongated stamped and formed sheet metal strip of nails which includes a plurality of substantially rectangular nail heads integrally interconnected along the length of the strip by integral interconnecting portions at the transverse edges of the nail heads, and a pair of nail shanks integrally extending at substantially right angles from each of the nail heads of the strip at the longitudinal edges of the nail heads. The integral interconnecting portions of the strip are advantageously swaged to increase the width thereof and decrease the thickness thereof for increasing the spacing along the strip between the nail shanks of the nails and for facilitating separation of the nails from the nailing strip. The integral interconnecting portions of the strip also desirably contain transverse grooves for providing fracture lines for the separation of the nails from the nailing strip. The nail shanks of the nailing strip are preferably tapered as they extend from the nail heads and the edges of the nail shanks desirably are provided with barbs.

The improved nailing machine for sequentially severing and driving nails from a nailing strip such as the one disclosed in said application Ser. No. 876,746, includes an anvil over which the nailing strip is sequentially advanced and beyond which a nail of the nailing strip extends, and a reciprocatable plunger for severing the nail extending from the nailing strip beyond the anvil and for driving the severed nail into a material. The extending nail preferably is severed along the fracture line in the integral interconnecting portion of the nailing strip. The machine also comprises reciprocatable control valve and nail guide means which, in a preferred embodiment of the invention, takes the form of a pair of spring biased workpiece engaging members. The reciprocatable workpiece engaging members, when positioned against a workpiece such as a roofing shingle, move to a retracted position to cause valve control means to set a control trigger, which, when depressed, releases air under pressure to advance the differential piston of the machine, and its associated nailing blade or plunger, to drive a nail into the workpiece. The reciprocatable workpiece engaging members also act to properly align a nail with relation to a workpiece and to prevent the next succeeding nail to be driven into the workpiece from interfering with a nail as it is being driven by the nailing blade or plunger of the machine. To this end, the reciprocatable workpiece engaging members advantageously are each provided with channel shaped means for receiving a portion of the shank of the next succeeding nail of the nailing strip to be driven thereby to prevent said next succeeding nail from making contact with the driven nail.

The magazine of the improved machine has a runway for receiving and supporting a nailing strip of the type described, the runway being associated with retractable nail strip advancing means for positively moving a nailing strip along the runway, and for enabling the easy positioning on, or removal from, the runway of a nailing strip.

The foregoing, and other features and advantages of the nailing machine of the present invention will become clear to those skilled in the art upon reference to the accompanying specification, claims and drawings wherein:

FIG. 1 is a fragmentary side elevational view of an embodiment of the nailing machine of this invention;

FIG. 2 is an end view in elevation of said embodiment of the nailing machine;

FIG. 3 is a sectional view taken substantially along line 3—3 of FIG. 1;

FIG. 4 is an enlarged fragmentary sectional view taken substantially along line 4—4 of FIG. 2;

FIG. 5 is a sectional view taken substantially along line 5—5 of FIG. 2;

Fig. 6 is a fragmentary sectional view of the nailing strip advancing means of the magazine of the nailing machine;

FIG. 7 is a fragmentary bottom view of the nailing strip advancing means in its retracted position in the magazine;

FIG. 8 is an enlarged view in perspective of one of the reciprocatable workpiece engaging members;

FIGS. 9 and 10 are sectional views at right angles to one another illustrating the reciprocatable workpiece engaging members in their extended, normal position;

FIGS. 11 and 12 are sectional views similar to FIGS. 9 and 10 but illustrating the workpiece engaging members in their retracted position, and a nail being driven into a workpiece by the reciprocatable plunger; and FIG. 13 is a schematic horizontal sectional view showing a nail of the nailing strip in a position to be severed and nailed into a material.

Referring, now, to FIGS. 1-4 of the drawings, the embodiment of the nailing machine illustrated, and designated generally by reference numeral 10, is of the pneumatically operated type disclosed in my aforementioned U.S. Pat. No. 3,601,300, and, as shown, includes a hollow housing 12 having a handle portion 14 provided with a cavity to which air under pressure is supplied through a fitting 16. A control trigger 18 is pivoted at 20 to the handle portion 14. The housing 12 further includes a foot plate 22 and a plunger guide plate 24 secured in superposed relation to one another to the bottom wall of the housing 12 by bolts 26. The foot plate 22 is provided with a centrally located opening 22a through which a reciprocatable plunger 30 (see FIG. 4) extends. As best shown in FIG. 4, an annular rubber bumper 32 is carried on the inner surface of the foot plate 22 around the reciprocatable plunger 30. The bumper 30 is engaged by a differential piston unit (not shown) by means of which the reciprocatable plunger 30 is driven when the piston unit is advanced by air under pressure as described in U.S. Pat. No. 3,601,300. The foot plate 22 has a plurality of vent passages 22b arranged circumferentially about the base of the annular rubber bumper 32 and the opening 22a therethrough for directing air, which is vented to atmosphere from below the differential piston unit (not shown) when the latter is reciprocated, about the bumper 32 for cooling the same. The foot plate 22 carries a lever 34 which is pivoted at 36 to the foot plate. The lever 34 has a pair of fingers 34a-34a, the function of which will become clear as the description proceeds The plunger guide plate 24 has a pair of spaced arms 24a-24a depending laterally therefrom. A magazine 40 extends between the arms 24a-24a and has flanges 40a-40a which are secured to the arms 24a-24a by bolts 42. A U-shaped reinforcing bracket 44, having flanges 44a-44a, is secured to the arms 24a-24a by the same bolts 42. The plunger guide plate 24 is provided with a pair of spaced, triangularly shaped plate members 46-46 which partly overlie a U-shaped channel member 48 to the inner wall of which a channel shaped plunger guide member 50, having inwardly extending plunger engaging sidewalls 50a-50a (see FIG. 13), is secured. The inner edges of the members 46-46, together with the outer side walls of the member 48 and the inner surface of the arms 24a-24a of the plunger guide plate 24, form a slideway 52 on each side of the plate 24 in which a pair of reciprocatable workpiece engaging safety bars 54-54 are positioned. The bars 54-54 are maintained in position in the slideways 52 by a cover plate 56 which is secured to the spaced, triangularly shaped plate members 46-46 by screws 58.

As best illustrated in FIG. 8, the bars 54-54 are generally rectangular in shape, and have a tapered, but blunted, workpiece engaging end 54a and a rounded, lever engaging end 54b. The bars 54-54 further are provided with an outwardly extending spring engaging arm 54c which advantageously is struck from the body of each of the bars. A channel shaped, nail shank receiving member 54d is secured at the lower end of the bars on the side thereof opposite to the side from which the spring engaging arm 54c extends. As shown in FIG. 5, a compression spring 60, one end of which is positioned on the arm 54c of a bar 54 and the other end of which is received in a countersunk bore in the foot plate 24 acts to extend the tapered ends 54a of each the bars 54 outwardly with relation to the channel member 48 of the plunger guide plate 24. The cover plates 56 each have an arcuate outwardly extending spring retaining arm 56a (see FIG. 1) which provides clearance for the spring engaging arm 54c of the reciprocatable workpiece engaging safety bars 54-54 when the bars are placed against a workpiece and moved to a retracted position. The cover plates 56 are slotted adjacent to the retaining arm 56a thereof to provide a shoulder 56b adapted to engage the spring engaging arm 54c of the bars 54 to limit the outward extension of the tapered ends 54a of the bars 54 when the machine is not in engagement with a workpiece The U-shaped channel member 48 of the plunger guide plate 24 is notched on each side to provide a recess 48a for receiving the nail shank receiving member 54d of each of the bars 54-54 when the bars are placed against an object to be nailed and are moved to a retracted position.

The arrangement of the control valve means of the embodiment of the nailing machine 10 illustrated is substantially the same as the arrangement of the control valve means of the nailing machine of my aforementioned U.S. Pat. No. 3,601,300. Thus, as shown in FIG. 4, the housing 12 has a valve 70 provided with a valve stem 70a extending outwardly through a hole in the foot plate 22 so as to be engageable by the pivotable lever 34. A compression spring 72 resiliently urges the valve 70 against a valve seat 74 when the valve 70 is in its normal, closed first position. A second valve 80 is located adjacent the valve 70, and is provided with a valve stem 80a which extends outwardly through a hole in the housing 12 to a point where it can be depressed by the trigger 18 when the trigger is pivoted at 20. A compression spring 82 resiliently urges the valve 80 against a valve seat 84 when the valve 80 is in its normal, closed first position.

Referring, now, to FIGS. 9-13, the nailing machine 10 includes an anvil 90 over which a nailing strip 92 is sequentially advanced and beyond which a nail 92a of the nailing strip extends where it is severed by the reciprocatable plunger 30 and driven into an object to be nailed. The nailing strip 92 advantageously is of the type shown in my said co-pending application Ser. No. 115,957. The nailing strip 92, like the nailing strip described in said application, preferably is fabricated of an elongated stamped and formed metal strip, and, as best shown in FIG. 13, comprises a plurality of nails 92a having substantially rectangular nail heads 92b which are integrally interconnected along the length of the strip by integral interconnecting portions 92c at the transverse edges of the nail heads 92b, and a pair of nail shanks 92d-92d integrally extending at substantially right angles from each of the nail heads 92b of the strip at the longitudinal edges of each of the nail heads 92b. The integral interconnecting portions 92c of the strip 92 at the transverse edges of the nail heads are preferably swaged so as, by metal flow, to increase substantially the width thereof and decrease substantially the thickness thereof. This swaging operates to increase the spacing along the strip 92 between the nail shanks 92d-92d of the nails 92a and to facilitate separation of the nails from the nailing strip. The nail heads 92b at the ends of integral interconnecting portions 92c desirably are provided with inwardly extending notches 92e which form stops for controlling the advance of the nailing strip 92 in the nailing machine 10. The nail shanks 92d-92d are advantageously tapered as they extend from the nail heads 92b, and terminate substantially in points, and the edges of the nail shanks are preferably provided with barbs for locking the same in the material into which the nails are driven by the reciprocatable plunger 30.

The reciprocatable plunger 30 has a cross-sectional configuration corresponding substantially to the configuration of the nail heads 92b of the nailing strip 92. In its reciprocating movement, the plunger 30 is guided by recesses or grooves 30a (see FIG. 4) which receive the inwardly extending sidewalls 50a-50a of the U-shaped channel member 50 (see FIG. 13).

As illustrated in FIGS. 1, 6 and 7, of the drawings, the magazine 40 of the embodiment of the nailing machine 10 illustrated, includes a runway 100 along which the nailing strip 92 is advanced in the direction of the anvil 90. A pair of opposed, spaced channel members 102-102 is positioned along the runway 100 in spaced relation thereto. The clearance between the inner sides of the members 102-102 and the nailing strip supporting surface of the runway 100 is sufficient to enable the nailing strip to freely move along the runway. The runway 100 and the channel members 102-102 are secured in a fixed position by straps 104 and 106. The sides of the straps are spaced from the sides of the runway 100 to provide clearance for the nail shanks 92d-92d of the nailing strip 92.

A channel shaped nailing strip advancing member 110 is slidably carried in the opposed channel members 102-102. The member 110, at its forward end has a narrow, channel shaped neck portion 110a to which a nailing strip engaging ram 112 is pivotably secured by a pin 114. The ram 112 has a narrow channel shaped extension 112a by means of which the ram is secured on the pin 114. As shown, the ram 112 has a nail head engaging portion 112b, and spaced sidewalls 112c-112c which normally straddle the runway 100. The leading edges of the sidewalls 112c-112c are tapered rearwardly so that the primary nailing strip advancing force exerted by the ram 112 is applied to the head 92a of the last nail of the nailing strip 92 and not the shanks 92d-92d thereof. In this manner, the shanks of the last nail of the strip will be properly aligned when the nail reaches the anvil 90. The pin 114 carries a coil spring 116 which acts to urge and maintain the sidewalls 112c-112c in their straddled position with relation to the runway 100. The extension 112a of the ram 112 rides in a slot or space 102a formed between the inner side walls of the channel members 102-102 while the sidewalls of the ram ride on the runway 100 and outside of the slot or space 102a. As shown in FIG. 7, the slot or space 102a is widened at its rearwardmost end to provide a ram receiving space 102b, and the inner side walls are extended laterally to provide a ram engaging surface 102c along which the extension 112a of the ram 112 rides when the member 110 is retracted.

The nailing strip advancing member 110 desirably is attached to the free end of a coil spring wound steel tape 120 by suitable fastening means such as a screw 122. The spring on which the tape 120 is wound is journaled for rotation on spaced ears 124-124 secured on the outer surface of the channel members 102-102 adjacent to the housing 12. A curved handle 126 advantageously also is secured to the member 110 by the screw 122. As shown in FIGS. 1 and 6, when a nailing strip 92 has been positioned on the runway 100 by inserting it at the rear end of the magazine 40, the nail head engaging portion 112b of the ram 112 engages the head 92b of the last nail on the strip 92. The force transmitted by the coil spring through the steel tape 120 connected to the member 110 maintains the portion 112b of the ram 112 in continuous contact with the nailing strip, and acts to advance the strip in the direction of the anvil 90 without disrupting the alignment of the nail shanks. When all of the nails on the strip have been used, or when, for some reason, it is desired to remove a nailing strip, or a portion thereof, from the runway 100, the member 110 is pulled rearwardly by means of the handle 126 until the member 110 makes contact with a spacer (not shown) at the rear of the runway which acts as a stop. As the member 110 is pulled rearwardly, the extension 112a of the ram is engaged by and rides along the surface 102c of the rear of the ram receiving space 102b formed by the channel members 102-102. As the extension 112a rides on the surface 102c, the sidewalls 112c-112c of the ram are pivoted upwardly, between the channel members 102-102, and clear of the runway 100. A new strip can then be easily positioned on the magazine 40, or a partially used strip can be readily removed.

FIGS. 9 and 10 show the safety bars 54-54 in their fully extended, normal position The plunger 30 is in an elevated position, and a nail 92a of the nailing strip 92 is extending forwardly at the anvil 90. When the safety bars 54-54 are placed against an object to be nailed, the bars are retracted against the compressive force exerted by the springs 60. The inner end 54b of each of the bars 54-54 engages the arms 34a-34a of the lever 34 causing the lever 34 to pivot thereby raising the valve 70, through its valve stem 70a, to its unseated, second position against the action of the spring 72 (see FIG. 4). When this occurs, the supply of air under pressure in the hollow housing 12 is interrupted in the manner described in my U.S. Pat. No. 3,601,300. The second valve 80 remains in its seated, or normal first position. However, when the trigger 18 is depressed, the stem 80a of the valve 80 moves the valve 80 to its second, unseated position against the action of the spring 82. As a result, the valves 70 and 80 are both in their second, unseated positions, and air under pressure in the housing 12 acts to advance the differential piston and the plunger 30 to drive a nail 92a from the nailing strip 92 into the object to be nailed.

The action of the plunger 30 as it is driven by the differential piston is illustrated in FIGS. 11 and 12. As shown in FIGS. 11 and 12, when the bars 54-54 are in a retracted position, the shanks of the next nail of the nailing strip to driven into an object to be nailed is received in the channel shaped members 54d on the bars 54-54. This prevents the shanks of the next nail from making contact with the nail being severed at the anvil 90 and driven into an object to be nailed. In addition, and as best shown in FIG. 12, as the nail being driven by the plunger 30 moves in the direction of the object to be nailed, the inner side of the shanks of the driven nail are in edge contact with the outer side of the channel shaped members 54d of the bars 54-54. The contact thus made between the shanks and the members 54d acts to properly vertically align the driven nail with the surface of the object to be nailed. The plunger guide plate 24 advantageously is provided with a guide roller 130 for the plunger 30.

When the bars 54-54 are removed from a workpiece or object to be nailed, the compression springs 60 resiliently urged the bars to their normal extended position. When the trigger 18 is released, the valves 70 and 80 are returned by their respective springs 72 and 82 to their seated, first positions, as shown in FIG. 4, and the differential piston is moved to its retracted or raised position. When the piston is so raised, another nail is advanced from the magazine 40 to an extended position with relation to the anvil 90 as shown in FIG. 10.

While for purposes of illustration, a preferred embodiment of the nailing machine of this invention has been described, modifications of the machine may become apparent to those skilled in the art and, therefore, this invention is to be limited only by the scope of the appended claims.

What is claimed is:

1. A pneumatically operated nailing machine including a housing, a reciprocatable plunger for sequentially severing and driving nails from a nailing strip when advanced, a reciprocatable air-operated piston unit in the housing for retracting an advancing the plunger, control means including control trigger means, pivotable lever means and control valve means, said control valve means including a first valve having a normal seated position and being movable by said lever means to a second unseated position when the nailing machine is placed against an object to be nailed and a second valve having normal position and movable to a second position when the control trigger means is operated, the arrangement of the control valve means being such that the reciprocatable plunger is driven by the air-operated piston unit only when both the first and second valves are moved to their second positions, the improvement comprising: a stationary anvil over which a nailing strip is sequentially advanced and on which the next to be driven nail of said strip is supported and beyond which a nail of said strip to be driven extends where it is severed by the reciprocatable plunger of the machine, a plunger guide member positioned forwardly with relation to the anvil, said plunger guide member having inwardly extending plunger engaging side walls, a pair of reciprocatable control valve actuating and nail guide members positioned on opposite sides of the anvil and being movable independently with relation to the anvil, one end of each of the reciprocatable control valve actuating and nail guide members being adapted to engage the pivotable lever means for effecting movement of said first valve from its normal seated position to its second unseated position when the other end of each of the reciprocatable control valve actuating and nail guide members is placed against an object to be nailed, and nail shank receiving means positioned at said other end of each of the reciprocatable control valve actuating and nail guide members for receiving and maintaining the shanks of the next to be driven nail on the anvil in a fixed position when said one of each of the reciptocatable control valve actuating and nail guide members engages the pivotable lever means and the reciprocatable plunger drives a nail into an object to be nailed.

2. A nailing machine according to claim 1 wherein the reciprocatable control valve actuating and nail guide members are each provided with an outwardly extending spring engaging arm adjacent said one end thereof for supporting one end of a spring, the other end of the spring being received in a recess at the base of the housing of the nailing machine.

3. A nailing machine according to claim 1 wherein a magazine is provided for supporting a nailing strip, said magazine comprising a runway which is straddled by the nail shanks of the nails as the nailing strip is advanced in the direction of the reciprocatable plunger, a pair of spaced opposed channel members positioned along the runway and defining a clearance to enable the nailing strip to freely move along the runway, a nailing strip advancing member slidably positioned between the opposed channel members, a nailing strip engaging ram pivotably secured to the nailing strip advancing member, said ram haivng a nail head engaging portion and spaced sidewalls which normally straddle the runway, the leading edges of said sidewalls being tapered rearwardly so that substantially all of the force exerted by the ram of the nailing strip will be directed at the head of the last nail of the nailing strip, and a ram receiving opening formed by the opposed channel members, said opening defining a ram engaging surface along which the ram rides when the nailing strip advancing member is in a retracted position, said ram engaging surface acting to pivot the ram in a direction away from and clear of the runway thereby enabling a nailing strip to be positioned on or removed from the magazine.

* * * * *